Jan. 19, 1932.  G. J. JESSEN  1,841,479
COMBINED CABLE AND WIRE SUPPORT
Filed Nov. 28, 1930

INVENTOR
G. J. Jessen
BY
ATTORNEY

Patented Jan. 19, 1932

1,841,479

UNITED STATES PATENT OFFICE

GEORGE J. JESSEN, OF OAKMONT, PENNSYLVANIA, ASSIGNOR TO AMERICAN TELEPHONE AND TELEGRAPH COMPANY, A CORPORATION OF NEW YORK

COMBINED CABLE AND WIRE SUPPORT

Application filed November 28, 1930. Serial No. 498,827.

This invention relates to a combination cable and wiring ring adapted to be hung at intervals upon a messenger wire to receive and support cables and electric conductors.

An object of the invention is to provide a unitary structure to be attached to messenger wires for receiving and supporting cables and electric conductors.

Another object of the invention is to provide a device of this character which may be easily and quickly applied to the supporting or messenger wire, and which, when applied, will firmly grip the messenger wire so that it will not be displaced when cables and conductors are drawn therethrough.

The novel features which are considered characteristic of this invention are set forth with particularity in the appended claim. The invention itself, both as to its organization and method of operation, together with other objects and advantages thereof, will be further explained in the following detailed description, having reference to the accompanying drawings consisting of the following figures:

Figure 1:
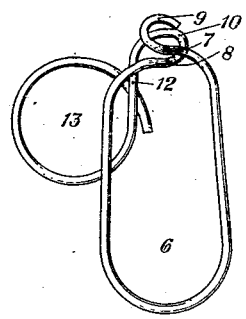
Figure 1 is a face view of the improved device.
Figure 3:
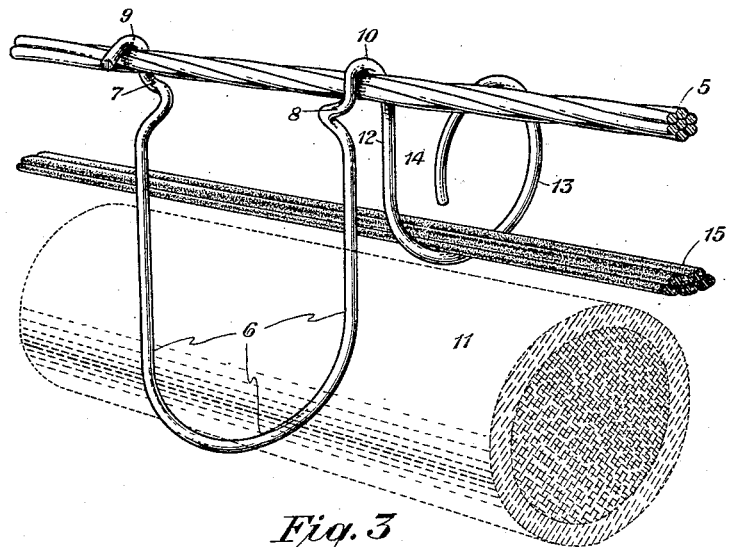
Fig. 3 is a perspective view showing the device applied to a messenger wire and supporting a cable and electric conductors.
Figure 2:
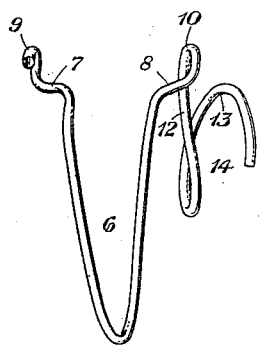
Fig. 2 is a side view thereof.

Referring to the drawings, 5 designates a messenger wire to which the support is adapted to be attached. The messenger wire is shown in the present instance as comprising strands twisted in spiral formation.

The cable and conductor support is preferably formed of a single piece of spring wire and includes a cable receiving loop portion 6 of substantially U-shape. In the attached position of the support, the loop portion will extend in a transverse position beneath the messenger wire. The ends of the loop portion are slightly rounded, and obliquely positioned arms or shoulders 7 and 8 extend laterally therefrom in opposite directions to each other. The arms 7 and 8 terminate in hook members 9 and 10, respectively. The axes of the hook members are normally out of register with each other.

The shoulders 7 and 8 will engage the bottom of the messenger wire, and the members 9 and 10 are adapted to be hooked thereover. In the attached position, the loop portion 6 provides a support whereby a cable 11 may be suspended from the messenger wire.

The hook member 10 is connected to a substantially vertical portion 12 from which a spiral or ring portion 13 extends. The major portion of the ring lies in a plane offset from the vertical portion 12 and a throat-way 14 is formed between said vertical portion and the end of the ring. In the attached position of the support, the ring 13 will lie beneath the messenger wire 5 and in a transverse position thereto. The ring 13 lies to one side of the loop portion and is adapted to support conductors which may be pulled therethrough or inserted in the throat-way 14 in a direction radial to the ring 13.

In attaching the support to a messenger wire, the hook member 10 is applied thereto in advance of the hook member 9 and the latter member is applied thereafter. This operation is performed by placing the ring portion 13 over the messenger wire and rotating the support so that it may be moved downwardly until the hook member 10 is seated on the messenger wire. In this position, pressure is applied to the sides of the loop portion to force them towards each other and the hook member 9 is sprung over the messenger wire. When the support is in position on the messenger wire, it will be sprung out of its normal condition, and the axes of the hook members will register with each other. The support in tending to resume its normal condition, will cause spring pressure to be exerted by the hook members to grip the messenger wire, thus clamping and locking the support thereon. The support is thus prevented from becoming accidentally displaced on the messenger wire.

If it is desired to remove the support from the messenger wire, an operation reverse to that just described is performed.

What is claimed is:

A cable support comprising a cable receiving loop adapted to extend transversely beneath a supporting wire, a hook on one end portion of said loop, a hook on the other end portion of said loop, and an extension to one of said hooks in the form of an open ring for supporting additional conductors, said extension lying transversely beneath the supporting wire and at one side of the cable receiving loop and having a loop portion encircling the additional conductors to prevent accidental displacement thereof.

In testimony whereof, I have signed my name to this specification this 17th day of November, 1930.

GEORGE J. JESSEN.